United States Patent Office 3,384,818
Patented May 21, 1968

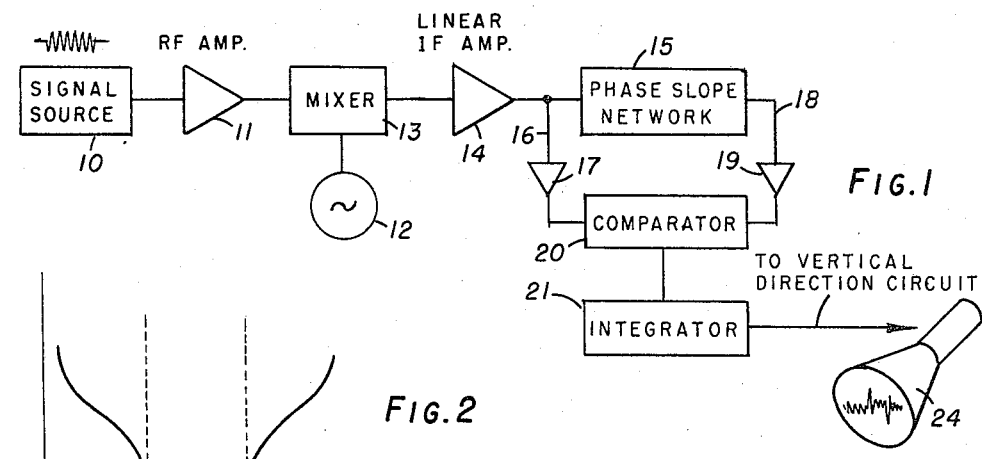
FIG.1
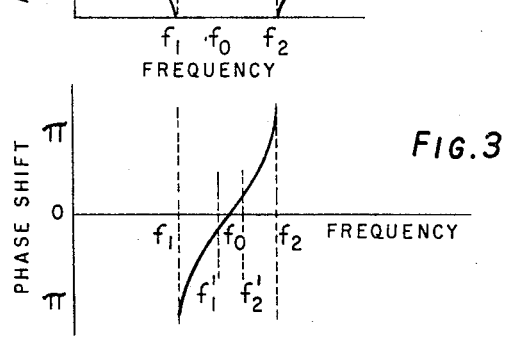
FIG.2
FIG.3
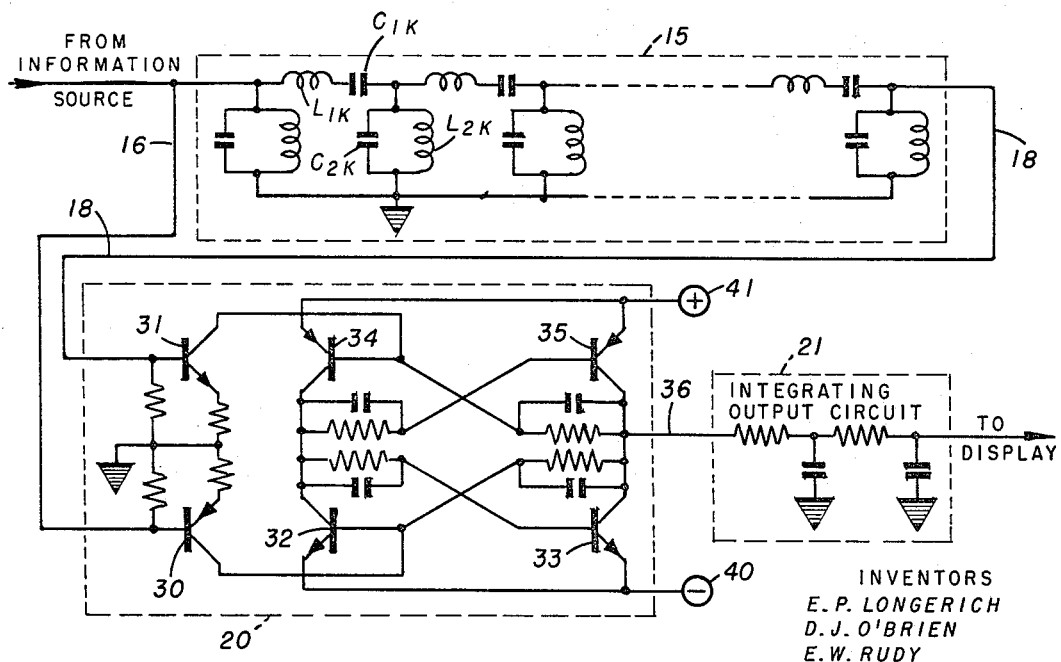
FIG.4
INVENTORS
E. P. LONGERICH
D. J. O'BRIEN
E. W. RUDY
BY Robert C. Smith
ATTORNEY

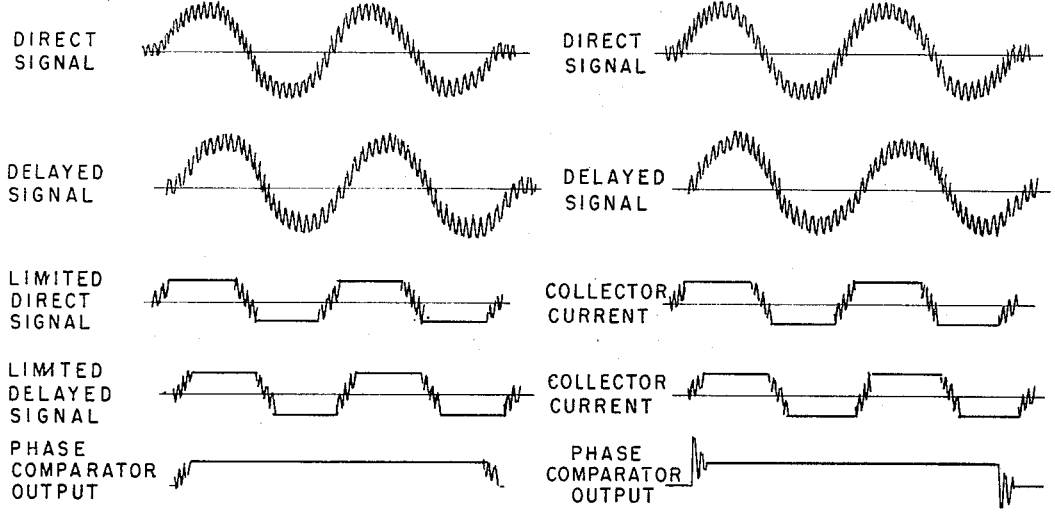
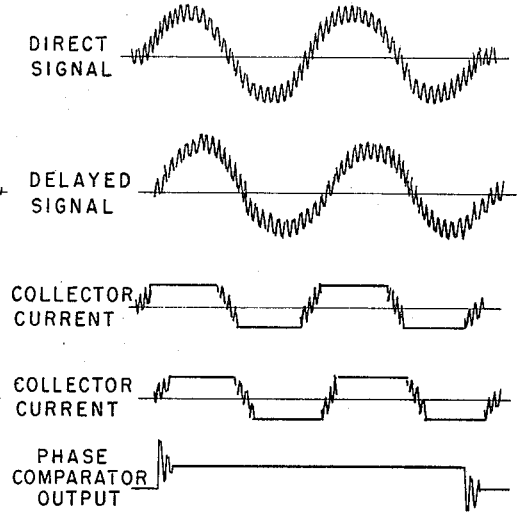
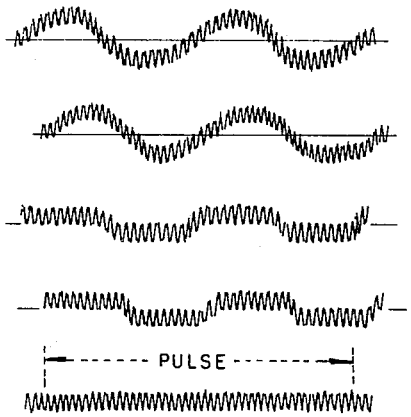
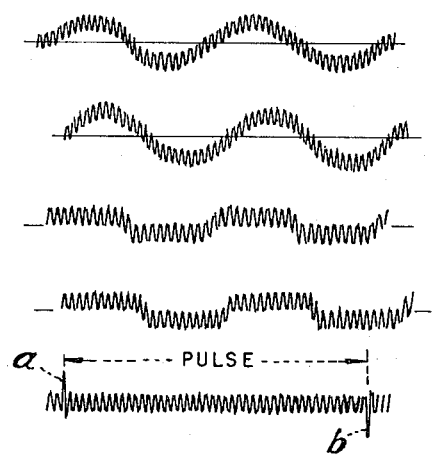

3,384,818
SYSTEM FOR DETECTING AND MEASURING DOPPLER FREQUENCY VARIATION IN A SINGLE PULSE OF ALTERNATING CURRENT
Ernest P. Longerich, Chatsworth, Calif., Donald J. O'Brien, Detroit, Mich., and Erland W. Rudy, Granada Hills, Calif., assignors to The Bendix Corporation, a corporation of Delaware
Continuation of application Ser. No. 330,344, Dec. 13, 1963. This application Jan. 30, 1967, Ser. No. 612,734
8 Claims. (Cl. 324—82)

ABSTRACT OF THE DISCLOSURE

A system for detecting carrier frequency shifts due to Doppler effect in pulses received at a receiver wherein the transmitted signal consists of a series of pulses each containing many cycles of the carrier, the system including a radio frequency amplifier, a mixer stage with a local oscillator and an intermediate frequency amplifier whose output is split, one part passing through a phase slope network or delay line whose phase shift is essentially linear with frequency changes before being connected to a multivibrator comparator and the other part being supplied to the comparator. The output of the comparator, after integration, is a voltage varying in magnitude with the phase difference between the signals supplied to the comparator, and this variation is displayed on a cathode ray tube.

---

This application is a continuation of Ser. No. 330,344, filed Dec. 13, 1963, now abandoned, and assigned to the same assignee as this application.

This invention relates to frequency discriminators, and more particularly to Doppler frequency detectors for pulsed systems capable of detecting Doppler frequency shift from a single pulse of short duration.

Systems have been proposed for the detection of Doppler shift in a single return echo pulse of echo ranging systems. Typically such systems operate by counting the number of zero crossings of the return echo as compared to the transmitted pulse and indicate the difference as Doppler shift. In a typical sonar ranging system operating at 8 kilocycles per second, transmitting pulses of 30-milliseconds length, a Doppler free echo will exhibit 481 zero crossings; i.e., 240 cycles with a zero crossing at both the beginning and end of the pulse. This method of measurement involves the counting of discrete steps (whole numbers of zero crossings), and consequently its resolution is limited by the minimum frequency shift which will result in a change of one count of zero crossings. In the case of an 8-kilocycle system this is equal to $$\pm \frac{1}{481}(8 \text{ kc.}) = 16.632 \text{ cycles}$$

Also, such as system is limited to detecting frequency shifts in 16.632-cycle steps. Where the Doppler shift is produced by movement of a naval target, the resolution may be expressed as ±2.97 knots, since the frequency change for an 8-kilocycle system is 5.6 cycles per knot. Therefore the zero crossing method of Doppler detection has a serious limitation on resolution related to the transmission frequency and the pulse length. In accordance with this invention, the detection of Doppler shifts is improved by an order of magnitude and within practical limits is not limited in resolution by pulse length.

The applicants have eliminated these limitations in prior art systems by use of an auto-correlation technique in a relatively simple circuit configuration to determine the Doppler shift of a single pulse with respect to a nominal center frequency.

In essence this invention employs a circuit, termed a phase slope network, through which a pulse is passed after being amplified. The phase slope network has the characteristic of a phase shift which varies with frequency and a wide frequency pass band, so that the pulse passing through the network is phase-shifted as a function of the frequency content of the pulse while suffering no frequency distortion. The pulse before and after passage through the network is introduced into a phase comparator which measures the phase difference between the coincident portions of the direct and delayed pulse. The resultant phase difference measured by the phase comparator is a direct function of the frequency deviation of the pulse from the design mean frequency. Resolution is only limited by the sensitivity of the phase comparator. Display of the Doppler or frequency-deviation information can be very practically accomplished by applying the output of the phase comparator to the vertical deflection circuit of a cathode ray oscilloscope while applying a sweep signal at the pulse repetition rate to the horizontal deflection circuit.

In accordance with another aspect of this invention, the phase-comparison operation is performed by a solid state multivibrator type phase comparator which not only provides a high degree of resolution, but provides positive discrimination between the information signal (Doppler) and noise, even in the extreme case of zero Doppler and high noise level; e.g., a signal-to-noise ratio less than one.

One feature of this invention resides in a frequency discriminator constituting the combination of a wide-band, frequency-sensitive network and means for determining the phase shift of pulses passed through the network and displaying the phase delay as an indication of frequency-deviation of the pulse from a mean frequency.

Another feature involves the combination of a wide-band, frequency-sensitive, passive phase slope network and a bistable multivibrator with input terminals connected to be triggered respectively by the input and the output of the network to constitute a frequency discriminator.

Another feature of this invention resides in the novel phase comparator comprising a bistable multivibrator employing two pairs of cross-coupled complementary type transistors and exhibiting virtually a zero switching time.

These and other features of this invention may be more clearly understood from the following detailed description and by reference to the drawing, in which:

FIG. 1 is a block diagram illustrating this invention in simplified form.

FIG. 2 is a graphical representation of the band pass characteristics of the phase slope network of the system of FIGS. 1 and 4.

FIG. 3 is a graphical representation of the frequency-phase shift characteristic of one section of the phase slope network of FIGS. 1 and 4.

FIG. 4 is an electrical schematic diagram of preferred embodiments of the delay network and phase comparator of FIG. 1.

FIG. 5 is a graphical representation of the operation of the invention of FIG. 1 employing a conventional phase detector.

FIG. 6 is a graphical representation of the system of FIG. 1 employing the novel phase comparator of FIG. 4.

Now referring to FIG. 1, this invention is illustrated as the Doppler frequency processing and display portions of a signal-receiving system. The source of signals shown here as a box 10 may constitute the receiving antenna of a radar set, the receiving transducer of an active or pulsed sonar system, or even a local signal source such as a glystron oscillator, wherever the frequency deviation of a single pulse from a standard is desired to be measured. The pulse from the signal source 10 is passed through a wide-band, low-distortion amplifier 11 to raise the level of the incoming signal sufficiently to be processed. The output of the amplifier 11 and the output of a local stable oscillator 12 are mixed in a conventional mixer circuit 13 to produce an intermediate frequency range suitable for processing such as 10 kilocycles per second plus or minus the deviation of the incoming signal. It is obvious that the oscillator 12 must have an extremely high stability, and for this reason a crystal oscillator is preferred with a normal operating deviation of less than 20 parts per million (p.p.m.) The accuracy of the entire system has as a limiting factor the stability of the oscillator as well as the linearity of the critical phase slope network hereinafter described.

The output of the mixer 13 is further amplified in IF amplifier 14 as required and thereafter introduced into a phase slope network 15 and simultaneously over lead 16 into a limiting amplifier 17 and then into a phase comparator 20.

The essential characteristics of the phase slope network 15 are, first, that attenuation across the frequency range of interest $f_2-f_1$ is uniform, i.e., the network has a flat response, and second, the phase shift of the network is virtually a linear function with frequency within the pass band. A third necessary characteristic which becomes very obvious on examination of the system operation is that the transmission delay in the network 15 is less than the pulse length of the pulse processed by the system.

A preferred embodiment of the network is shown in FIG. 4, and a full exposition of the characteristics required for network design is given in connection with that figure.

The output of the network 15 is conducted through lead 18 and a limiter amplifier 19 to the second input terminal of phase comparator 20, whereby the pulse before and after transmission through the phase slope network 15 may be phase-compared. In effect, the system employs an auto-correlation technique comparing the signal as received (after conversion to the IF frequency) with itself after passage through the network 15.

In the phase comparator 20 employed in accordance with this invention, the output is a voltage varying in magnitude with the phase difference between the two input pulses. The output voltage from the phase comparator, after passage through an integrator 21, is preferably analyzed on a visual type display such as the cathode ray oscilloscope 24 with the phase comparator output applied to the vertical deflection circuit. The output is displayed on a vertical scale with the base line constituting the reference and corresponding to zero Doppler. Increasing frequency or "up" Doppler is displayed as a vertical deviation above the base line of the trace. Similarly, decreasing frequency or "down" Doppler appears as a displacement of the trace below the base line for a period approximately equal to the pulse length.

When using a cathode ray oscilloscope display, the signal will typically appear as shown in the drawing (FIG. 1) as a noisy signal centered about the X axis with an abrupt deviation above or below the axis for a period of time less than the pulse length, dependent upon the direction of frequency shift from the center frequency and separated at both edges from the remaining spectrum by a pair of pronounced signal excursions or spikes of greater amplitude than the deviation of the displayed pulse.

It is apparent from the description and the block diagram of this invention that the critical elements of the combination are the phase slope network 15 and phase comparator 20, since all of the other elements of the system are conventional circuits and all used in their normal manner. The co-action of the phase slope network 15 and phase comparator 20 results in a detection of Doppler shift as low as 0.01% of a 10-kilocycle per second signal from a single 30-millisecond pulse.

In order to insure such results, it is essential first that the phase slope network 15 have the characteristics as illustrated in FIGS. 2 and 3 of the drawing. In FIG. 2 the Doppler frequency range of interest is illustrated as falling between $f_1$ and $f_2$, over which range the attenuation is virtually flat. The flatness of the attenuation-frequency curve is desirable so that amplitude deviation affecting the phase comparison measurement is minimized. This requirement may be relaxed to a limited extent where the phase comparator is one of the type preferred here, e.g., a multivibrator type, and where the IF amplifier 14 has sufficient gain that the signal introduced into the phase comparator 20 through both input limiter amplifiers 17 and 19 provides optimum switching of the multivibrator stages.

The critical characteristic of the phase slope network 15, as far as accuracy of the output is concerned, resides in the curve of FIG. 3. The phase shift of a signal passing through the network must be as linear as possible over the range of $f_1$ to $f_2$. In practice, only a small portion of the pass band $f_1-f_2$ is used, for example the range $f_1'-f_2'$, thereby utilizing the more linear portions of the phase characteristic curve.

The requisite characteristics of the phase slope network 15 are easily obtained in systems operating up to 6 megacycles per second through the use of a constant K bandpass filter having its center frequency corresponding to $f_0$ and lower and upper cut-off frequencies corresponding to $f_1$ and $f_2$. A preferred form of band-pass filter appears in FIG. 4, which constitutes a network made up of a number of sections $n$, each of which includes an inductor and capacitor in the series arm and a parallel combination of an inductor and capacitor in the shunt arms. The component values, of course, are determined by the center frequency, frequency range of interest, and impedance matching considerations.

As an example, in the 8-kilocycle-per-second Doppler sonar system with an expected Doppler frequency change of 110.4 cycles per second (equivalent to ±20-knot range of speeds of the target), we would apply the following design criteria to the delay network:

Where limited in accuracy of the system to a 1° difference in phase shift as the ultimate limit of sensitivity of the phase detector, it will be necessary that the delay network exhibit 1° of phase shift for each 0.736 cycle per second of frequency shift (or 0.1314 knots Doppler) with a total phase shift of 150° corresponding to the maximum Doppler rate of 20 knots, or 110.4 cycles per second. In order to insure that the phase shift will be linear with frequency, it is necessary that the total phase shift per section be limited. A typical practical limit is 15° phase shift per section, thereby obtaining a 10-section filter to provide the 150°. The standard expression for the phase shift per section of a constant K filter is:

$$C = 2 \sin^{-1} \frac{f^2 - f_0^2}{f(f_2 - f_1)}$$

where $f$ is the frequency producing the desired phase shift of 15° (i.e., $f_0 \pm 150$ c.p.s.)
$f_0$ is the center frequency, assuming 10 kc./s.
$f_2$ is the upper cut-off frequency
$f_1$ is the lower cut-off frequency
C is the phase shift in degrees Therefore, for a 15° phase shift at 10 kilocycles per second the band width, or $f_2-f_1$, may be determined to be equal to 1.68 kc. Once the range between the cut-off frequencies is determined, a standard formula can be used to determine the particular values of the capacitors and inductors needed in the network. These formulas are:

$$L_{1K} = \frac{R}{2\pi(f_2 - f_1)}$$

$$L_{2K} = \frac{R(f_2 - f_1)}{2\pi f_0^2}$$

$$C_{1K} = \frac{(f_2 - f_1)}{2\pi R f_0^2}$$

$$C_{2K} = \frac{1}{2\pi R (f_2 - f_1)}$$

For above conditions:

$L_{1K} = 122.6 \times 10^{-3}$ henrys and $R = 1296\Omega$
$L_{2K} = 3.47 \times 10^{-3}$ henrys
$C_{1K} = 0.002$ microfarad
$C_{2K} = 0.073$ microfarad where conventional terminating half sections are used to match a resistance load of 1296 ohms. Therefore, employing the standard criteria and formula given above, the parameters of a delay network 15 for a particular system requirement may be easily derived.

There is one additional phase slope network parameter of interest, as indicated above, and that is the *total delay time* for a signal passing through the network. It is obvious that if the delay time is greater than the pulse length there will be no coincidence of the direct and delayed pulse at the input conductors to the phase comparator 20 necessary to achieve a phase comparison. As an example of this limitation employing the 10-kc.-per-second signal, if there is a maximum of 150° phase shift for a Doppler efrequncy of 110.4 c.p.s., the delay is determined by:

$$t_d = \frac{d_\theta}{d_\omega}, \text{ or total delay} = \frac{\text{total phase shift}}{\text{maximum Doppler shift}}$$

$d_\theta = 150° = 2.618$ radians $d_\omega = 2\pi(110.4) = 693.3$ radians per second $t_d = \frac{2.618}{693.3} = .00377$ sec. for a 10-section network or 3.77 millisecond total delay Therefore the system operating at a 10-kc. center frequency will respond to pulses reasonably larger than 3.77 milliseconds in length to provide Doppler measurement information from a single pulse. Normal sonar pulses may be expected to be in the order of 30 milliseconds in length, thereby providing more than adequate assurance of successful operation of the system employing a phase slope network with the characteristics computed above.

The phase comparator 20, as shown in FIG. 4, comprises a pair of complementary transistor type pulse amplifiers 30 and 31 with the information pulse applied directly through lead 16 to the base of a PNP transistor 30 and the same pulse after passage through the phase slope network 15 and lead 18 applied to the base of NPN transistor 31. The base and emitter electrodes of both transistors 30 and 31 are connected through bias resistors to ground, and the output of each pulse amplifier transistor 30 or 31 is taken from the collector thereof and introduced as the triggering input to a bistable multivibrator which acts as the phase comparator.

It should be noted that the pulse amplifier transistors 30 and 31, being of opposite type, conduct on opposite half cycles of a sine wave input so that the transistor 30 responds to the negative voltage swing applied thereto to trigger the multivibrator while the positive excursion of each cycle produces conduction of transistor 31. This arrangement provides triggering pulses to the multivibrator 180° out of phase in the absence of any phase delay in the phase slope network 15. This characteristic is particularly valuable in that it allows the output of the phase comparator 20 to be integrated with a summation of zero corresponding to zero Doppler shift.

The phase-comparing circuit comprises a bistable multivibrator including two pairs of cross-connected transistors. The first pair of transistors 32 and 33 of NPN type have their emitters connected to a negative voltage supply 40 and their collectors cross-connected through parallel resistance-capacitance networks to the base electrodes of the opposite transistor, all in a conventional manner. The output of the phase comparator 20 is taken on lead 36 from the collector of transistor 33 while the negative trigger pulse from pulse amplifier 30 is applied to the base of transistor 32.

In place of the resistors conventionally found in multivibrators connecting the collector electrodes of the NPN transistors 32 and 33 to a voltage supply terminal are found in this improved multivibrator a pair of similarly cross-connected PNP transistors 34 and 35.

The triggering input from pulse amplifier 31 is applied to the base of PNP transistor 34, and the collectors of both transistors 34 and 35 are directly connected to the collectors of respective transistors 32 and 33.

In normal operation the multivibrator remains in a stable condition in the absence of any input signal or in the presence of input noise switches at a random rate. In a particular cycle the transistor 32 is conducting in the absence of a negative trigger pulse from amplifier 30. The low saturation resistance of transistor 32 results in the application of effectively the voltage negative supply 40 to the base of transistor 35, thereby forward-biasing that transistor in full conduction. In its low-impedance conducting condition, transistor 35 applies virtually the positive supply 41 voltage to the output lead 36. At the same instant the transistors 33 and 34 are back-biased by the application of a negative voltage to the base of transistor 33 and a positive voltage to the base of transistor 34. With the arrival of a negative pulse from pulse amplifier 30 at the base electrode of transistor 32 the transistor 32 is cut off, and its collector voltage almost instantaneously assumes the potential of the positive supply 41 (except for the voltage drop due to the saturation resistance of transistor 34). This positive potential applied to the base of transistor 35 through the cross-coupling connection cuts off transistor 35. The cross-coupling connections between the collector of transistor 32 and base of transistor 33 forward-biases this last transistor until it assumes its low impedance condition and applies virtually the potential of the negative supply 40 to the lead 36. Transistor 34 is forward-biased, similar to transistor 33. The net result is the generation of a negative voltage excursion of approximately 0.1 microsecond rise time on the lead 36. The negative voltage excursion remains on lead 36 until a triggering pulse arrives at transistor 34, at which time transistors 34 and 33 are cut off, and transistors 32 and 35 assume their low-impedance condition, thereby producing a positive voltage excursion on lead 36 in a usual bistable multivibrator action. The multivibrator employing the four transistors provides not only rapid positive switching but dissipates little power. The output impedance is low, and the current drawn is a function of the supply and load impedances and virtually independent of the multivibrator component variables. This feature allows the accurate measurement and display of Doppler shift without significant calibration problems.

Since the multivibrator responds to opposite polarity voltage excursions on leads 16 and 18, it generates a square wave output having a D.C. content proportional to the phase relationship of the triggering pulses. This D.C. information content is extracted by passing through a simple integrator 21 for display on the cathode ray oscilloscope.

The particular advantage of the phase comparator 20 of FIG. 4 is illustrated by comparison of FIGS. 5 and 6. FIG. 5a illustrates the operation of the system of FIG. 1 employing a conventional phase comparator, while FIG. 6a illustrates the same signal input to the system of FIG. 1 in which the phase comparator of FIG. 4 is employed. In the examples of FIGS. 5a and 6a a signal-to-noise ratio of 10 is represented and a frequency deviation or Doppler shift of 0.5% from the mean or center frequency. The inherent delay of the phase slope network 15, plus the delay or phase shift due to the phase-frequency characteristics of the network 15, produces the shifting of the second weveform of each (FIGS. 5a and 6a). The same signals, when limited, appear as the next two traces in both FIGS. 5a and 6a. In a typical phase comparator the output prior to arrival of the first signal is zero and increases to a discrete level, depending upon the time of arrival of the delayed pulse, and then remains constant (assuming no change in Doppler shift during one pulse) until the end of the direct pulse to revert to zero level. In FIG. 5a the respresented Doppler shift is quite clear, and the length of the pulse is relatively precise. By comparison with FIG. 6a, the advantage of the phase comparator of FIG. 4 is apparent. The same degree of deviation of the trace from the base line is present; however, the pulse extremities are clearly and precisely defined by an abrupt voltage excursion of magnitude significantly greater than any normally measured deviation. This facilitates the observation of the indicated Doppler shift and, as a second important advantage, allows the measurement of the pulse length. In certain systems this latter feature is of extreme importance where the pulse length itself carries information content.

The most obvious advantage of the phase comparator of FIG. 4 appears when the requirement is to detect extremely low Doppler shifts (including zero Doppler) of a signal submerged in random noise. FIG. 5b illustrates an extreme case of a noisy signal and zero Doppler. In the last trace it is apparent that the existence of a signal is not observable. Consequently there is no way of determining whether the display shows a signal of zero Doppler in a high noise background or no signal at all. By way of contrast in FIG. 6b, illustrating representative signals, the voltage excursions a and b clearly define the limits of the pulse, and the lack of deviation from the base line denotes zero Doppler. This advantage is achieved through combination of the phase slope network and multivibrator phase comparator of FIG. 4 which produces a voltage excursion in the negative direction in the presence of a signal input to the pulse amplifier 30 when the signal level at the pulse amplifier 31 is at a lower level, e.g., before the pulse delayed by passage through the phase slope network arrives. Similarly after the end of the direct pulse, where the signal level of the pulse amplifier 31 is fully limited and typically less than full limited noise is at amplifier 30, the multivibrator produces a positive voltage excursion defining the end of the pulse.

Therefore, employing the novel system of this invention, the detection and accurate measurement of low-level (including zero) Doppler shifts may be readily accomplished. The circuitry employed in the system has the advantage of simplicity. The particular phase detector employed not only allows the indication of Doppler shift, but by the unique arrangement produces transient indications of the beginning and end of the pulse to be measured.

Although for the purpose of explaining the invention a particular embodiment thereof has been shown and described, other modifications within the spirit and scope of this invention will occur to persons skilled in the art. The scope of this invention is only limited by the appended claims.

We claim:

1. A Doppler frequency detector capable of detecting low-level Doppler frequency shifts from a nominal center frequency in a single pulse a small fraction of a second in duration comprising:
   a frequency-sensitive passive network producing a predetermined phase shift in alternating signals of said nominal frequency and a phase shift varying as a substantially linear function of the deviation from said nominal frequency;
   a phase comparator having a pair of input stages for the application of a pair of alternating signals to be phase-compared;
   said phase comparator comprising a bistable multivibrator producing two substantially equal discrete output voltage levels of opposite polarity and of duration depending upon the phase relationship of alternating signals applied to the input stages;
   means connecting a pulse of frequency to be determined to the input of said frequency-sensitive passive network;
   means applying the said pulse to the input of said phase comparator;
   means connecting the output of said frequency-sensitive passive network to the second input stage of said phase comparator;
   means for integrating the output of said phase comparator over a period at least as great as the duration of a pulse applied to said detector;
   and means for indicating the integrated output of said phase comparator as a function of the Doppler frequency content of said pulse.

2. A device for detecting and measuring a shift in frequency from a selected nominal frequency in a single pulse signal of alternating current of such length that it contains a substantial number of cycles of said nominal frequency comprising:
   an electrical network which produces a phase shift in said pulse signal varying as a substantially linear function of a shift in frequency from said selected nominal frequency;
   a phase comparator having a first input and a second input, said phase comparator including multivibrator means and connections from said multivibrator means to voltage sources of equal amplitude and opposite polarity such that said phase comparator responds to alternating current signals at said first and second inputs by producing an alternating square wave output having an amplitude which is substantially equal to said voltage sources and a pulse duration of each polarity varying linearly with the phase difference between the signals connected to said first and second inputs;
   a source of input pulse signals of alternating current subject to frequency variation;
   means connecting said source to said first input of the phase comparator and to said network;
   means connecting the phase-shifted pulse output from said network to the second input of said phase comparator;
   and means connected to said phase comparator for representing its output as an indication of the shift in frequency from said selected nominal frequency.

3. A frequency detecting and measuring device as set forth in claim 2 wherein said last named means includes means for integrating the output of said phase comparator and means for indicating said shift in frequency from said selected nominal frequency as a function of the integrated output of said phase comparator.

4. The combination in accordance with claim 2 wherein said electrical network comprises a passive filter having a substantially linear phase shift-frequency characteristic over the frequency deviation range of alternating current signals applied thereto.

5. The combination in accordance with claim 2 wherein said electrical network comprises a passive filter having a pass band at least as wide as the frequency range of deviation of the pulse signal to be measured and a transmission time delay less than the length of pulse signals applied thereto.

6. A Doppler frequency detector for detecting and measuring a shift in frequency from a selected nominal frequency in a single pulse signal of alternating current of such length that it contains a substantial number of cycles of said nominal frequency comprising:
   an electrical network which passes alternating signals of a known frequency range and which produces a phase shift varying with the deviation of said signals from said nominal frequency;
   bistable switching means connected to receive voltage excursion signals of one polarity to switch to one state and voltage excursions of the opposite polarity to switch to the opposite state, said bistable switching means being operative at a switching speed in excess of the said nominal frequency and having a square wave output consisting of alternate cycles of equal amplitude and opposite polarity and of duration varying with the phase difference between the signals connected thereto;

a source of input alternating pulses subject to frequency variations from said nominal frequency;

means connecting said source to said network;

means connecting said input pulse as one switching input to said bistable switching means;

means connecting the phase-shifted pulse output of said electrical network to said bistable switching means as the second switching input thereto; and means connected to the output of said bistable switching means for displaying said output as function of the Doppler frequency shift of said input pulse from the selected nominal frequency.

7. A frequency detecting and measuring device as set forth in claim 6 wherein said last named means includes means for integrating the output of said phase comparator and means for indicating said shift in frequency from said selected nominal frequency as a function of the integrated output of said phase comparator.

8. The combination in accordance with claim 6 wherein said bistable multivibrator comprises first and second NPN transistors connected in a bistable multivibrator configuration, and first and second PNP transistors connected in a bistable multivibrator configuration the collectors of said first NPN and PNP transistors being connected together and the collectors of said second NPN and PNP transistors being connected together, and negative and positive voltage supply means connected to said NPN and PNP transistor emitter electrodes respectively such that the voltage appearing at the collectors of said second NPN and PNP transistors alternates between substantially the value of said positive supply voltage upon the application of alternate opposite polarity input signals to the base electrodes of said first NPN and PNP transistors.

References Cited

UNITED STATES PATENTS

| | | |
|---|---|---|
| 2,513,731 | 7/1950 | Loughlin. |
| 2,580,148 | 12/1951 | Wirkler. |
| 2,896,162 | 7/1959 | Berger et al. _____ 324—77 X |
| 2,963,648 | 12/1960 | Baskin et al. _____ 324—83 |
| 2,970,258 | 1/1961 | Sinclair _____ 324—57 |
| 3,180,936 | 4/1965 | Schroeder _____ 324—77 X |

RUDOLPH V. ROLINEC, *Primary Examiner.*

P. F. WILLE, *Assistant Examiner.*